US009520088B2

(12) United States Patent
Lim

(10) Patent No.: US 9,520,088 B2
(45) Date of Patent: Dec. 13, 2016

(54) DISPLAY DEVICE HAVING FLEXIBLE FILM CABLE

(71) Applicant: LG DISPLAY CO., LTD., Seoul (KR)

(72) Inventor: Yirang Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 224 days.

(21) Appl. No.: 14/038,344

(22) Filed: Sep. 26, 2013

(65) Prior Publication Data

US 2014/0085281 A1 Mar. 27, 2014

(30) Foreign Application Priority Data

Sep. 26, 2012 (KR) ........................ 10-2012-0107010
Aug. 19, 2013 (KR) ........................ 10-2013-0098120

(51) Int. Cl.
*G06F 3/038* (2013.01)
*G09G 3/32* (2016.01)

(52) U.S. Cl.
CPC .......... *G09G 3/3291* (2013.01); *G09G 3/3266* (2013.01); *G09G 2300/0426* (2013.01); *G09G 2330/04* (2013.01)

(58) Field of Classification Search
CPC ................ G09G 3/3266; G09G 3/3291; G09G 2300/0426; G09G 2330/04; G09G 3/32
USPC .......................................................... 345/206
See application file for complete search history.

(56) References Cited

U.S. PATENT DOCUMENTS

| | | | | |
|---|---|---|---|---|
| 5,201,903 | A * | 4/1993 | Corbett et al. | 29/872 |
| 6,977,640 | B1 * | 12/2005 | Baek et al. | 345/102 |
| 2002/0189862 | A1 * | 12/2002 | Miyake | H05K 3/361 174/262 |
| 2004/0214375 | A1 | 10/2004 | Naitoh | |
| 2011/0134103 | A1 * | 6/2011 | Nam et al. | 345/212 |
| 2012/0056859 | A1 * | 3/2012 | Chen | G09G 3/20 345/204 |
| 2013/0141664 | A1 * | 6/2013 | Toyoyama | 349/59 |

FOREIGN PATENT DOCUMENTS

| | | | |
|---|---|---|---|
| CN | 1542934 | A | 11/2004 |
| CN | 102087842 | A | 6/2011 |

* cited by examiner

*Primary Examiner* — Towfiq Elahi

(74) *Attorney, Agent, or Firm* — Birch, Stewart, Kolasch & Birch, LLP

(57) ABSTRACT

A display device includes a display panel including a pixel array including data lines, gate lines crossing the data lines, and pixels arranged in a matrix form, a source driver integrated circuit (IC) for supplying a data voltage to the data lines, a gate driver IC for supplying a gate pulse to the gate lines, and a first flexible film cable bonded to a substrate of the display panel. The first flexible film cable includes lines for transmitting gate timing control signals and gate driving powers received from a printed circuit board to the gate driver IC. The first flexible film cable has a thickness of about 20 μm to 100 μm.

14 Claims, 8 Drawing Sheets

DISPLAY DEVICE HAVING FLEXIBLE FILM CABLE

This application claims the benefit of Korean Patent Application No. 10-2012-0107010 filed on Sep. 26, 2012, and Korean Patent Application No. 10-2013-0098120 filed on Aug. 19, 2013. The entire contents of all these applications are incorporated herein by reference for all purposes as if fully set forth herein.

BACKGROUND OF THE INVENTION

Field of the Invention

Embodiments of the invention relate to a display device having a flexible film cable.

Discussion of the Related Art

Examples of a flat panel display include a liquid crystal display (LCD), a plasma display panel (PDP), an organic light emitting display, and an electrophoresis display (EPD). The liquid crystal display displays an image by controlling an electric field applied to liquid crystal molecules based on a data voltage. An active matrix liquid crystal display has advantages of a reduction in the production cost and an improvement of a performance with the development of the process technology and the driving technology, and thus is the most widely used display device applied to almost all display devices including small mobile equipments and large-sized televisions.

Because the organic light emitting display is a self-emitting device, it has lower power consumption and thinner profile than the liquid crystal display requiring a backlight unit. Further, the organic light emitting display has advantages of a wide viewing angle and a fast response time. Thus, the organic light emitting display has been considered as a next generation display device capable of replacing the liquid crystal display.

Each pixel of the organic light emitting display includes an organic light emitting diode (OLED) having a self-emitting structure. The OLED includes organic compound layers such as a hole injection layer, a hole transport layer, an emission layer, an electron transport layer, and an electron injection layer. The OLED emits light when electrons and holes are combined in an organic layer through a current flowing in a fluorescence or phosphorescence organic thin film.

The organic light emitting display requires display panel driving circuits including source driver integrated circuits (ICs) for generating a data voltage, gate driver ICs for generating a gate pulse (or scan pulse) synchronized with the data voltage, a timing controller for controlling operation timings of the source driver ICs and the gate driver ICs, etc. The timing controller transmits digital video data of an input image to the source driver ICs. The timing controller generates a source timing control signal for controlling the operation timing of the source driver ICs and a gate timing control signal for controlling the operation timing of the gate driver ICs. The gate timing control signal may be transmitted to the gate driver ICs through a flexible circuit substrate such as a flexible flat cable (FFC) and a flexible printed circuit (FPC). The FPC is manually inserted into a connector installed in a printed circuit board (PCB) and thus is connected to the PCB. The FPC may be bonded to a display panel through an anisotropic conductive film (ACF). Further, the FPC may be bonded to the PCB and the display panel through the ACF. Both terminals of the FPC are connected to each other through a connector. Thus, when a source PCB is connected to a gate PCB, the FPC is connected to a connector mounted on the source PCB and a connector mounted on the gate PCB.

The flexible circuit substrate such as the FFC and the FPC has a multi-layered bonding structure, in which films each having a thick thickness of about 300 μm to 350 μm and the large modulus of elasticity are bonded to one another. Hence, when the PCB is disposed in the rear of the display panel by bending the flexible circuit substrate, a crack may be generated in the flexible circuit substrate or in a bonding surface between the FFC or the FPC and the display panel. Thus, when the flexible circuit substrate is bonded to the display panel and is bent, a defective rate of the flexible circuit substrate increases.

A high potential pixel power voltage EVDD and a low potential pixel power voltage EVSS are supplied to the pixels of the organic light emitting display. However, if EVDD lines for supplying the high potential pixel power voltage EVDD and EVSS lines for supplying the low potential pixel power voltage EVSS are short-circuited, a burnt out may be generated in a short-circuited portion.

SUMMARY OF THE INVENTION

Embodiments of the invention provide a display device capable of preventing a crack from being generated in a flexible circuit substrate and preventing a burnt out of a display panel when the flexible circuit substrate bonded to the display panel is bent.

In one aspect, there is a display device comprising a display panel including a pixel array including data lines, gate lines crossing the data lines, and pixels arranged in a matrix form, a source driver integrated circuit (IC) configured to supply a data voltage to the data lines, a gate driver IC configured to supply a gate pulse to the gate lines, and a first flexible film cable bonded to a substrate of the display panel, the first flexible film cable including lines for transmitting gate timing control signals and gate driving powers received from a printed circuit board to the gate driver IC.

The first flexible film cable has a thickness of about 20 μm to 100 μm.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

In the following description, exemplary embodiments of the invention will be described using an organic light emitting display as an example of a flat panel display. Other types of flat panel displays may be used.

Figure 1:
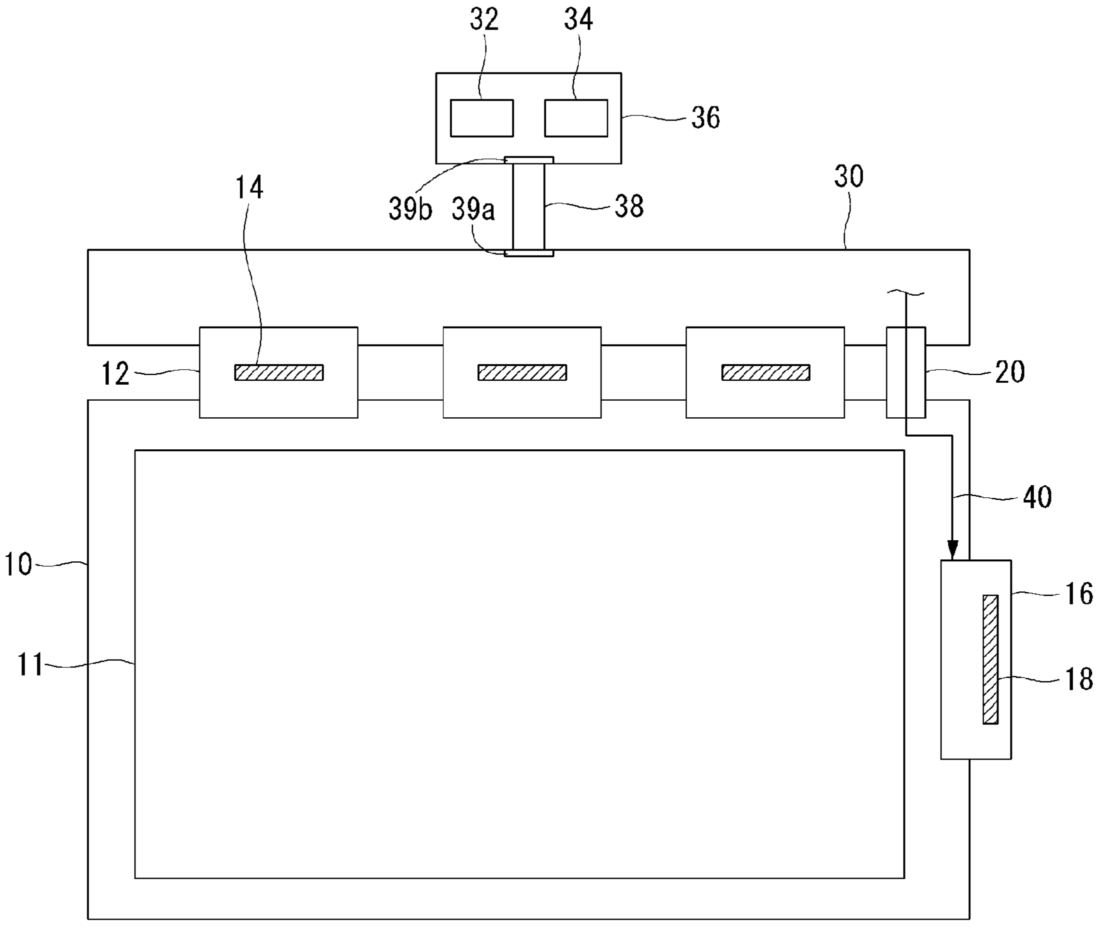
FIG. 1 is a plane view schematically showing an organic light emitting display according to an exemplary embodiment of the invention.
Figure 2:
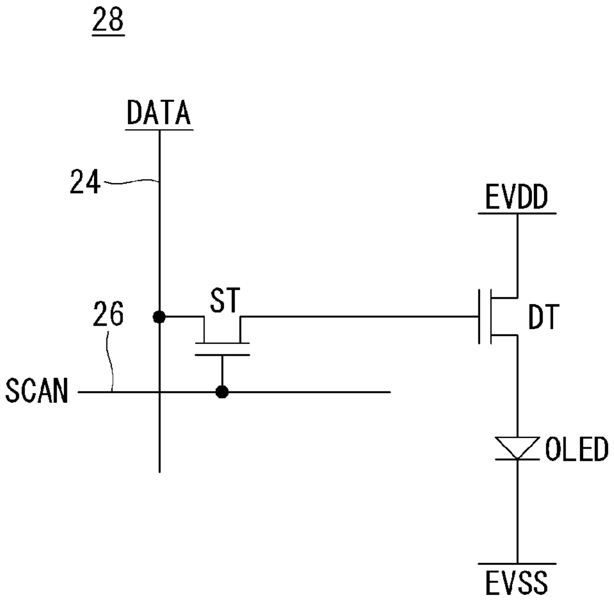
FIG. 2 is an equivalent circuit diagram showing a pixel of an organic light emitting display according to an exemplary embodiment of the invention.

As shown in FIGS. 1 and 2, an organic light emitting display according to an exemplary embodiment of the invention includes a display panel 10, a source printed circuit board (PCB) 30, a control PCB 36, flexible circuit films 12, 16, and 38, a flexible film cable 20, etc.

A substrate of the display panel 10 may be manufactured using a glass substrate, a plastic substrate, a metal substrate, etc. The display panel 10 includes a pixel array 11 used to reproduce an input image. The pixel array 11 includes data lines 24 to which a data voltage is supplied, gate lines 26 to which a gate pulse SCAN is supplied, and pixels 28 arranged in a matrix form. Each of the pixels 28 includes a switching thin film transistor ST, a driving TFT DT, and an organic light emitting diode (OLED). The switching TFT ST supplies the data voltage to a gate electrode of the driving TFT DT in response to the gate pulse SCAN. The driving TFT DT is connected between high potential pixel power voltage lines (hereinafter, referred to as "EVDD lines"), to which a high potential pixel power voltage EVDD is supplied, and the OLED and adjusts a current flowing in the OLED based on the data voltage applied to the gate electrode of the driving TFT DT. A compensation circuit for compensating for a threshold voltage and mobility of the driving TFT DT may be built in each pixel 28. Any well-known compensation circuit may be used.

Figure 7:
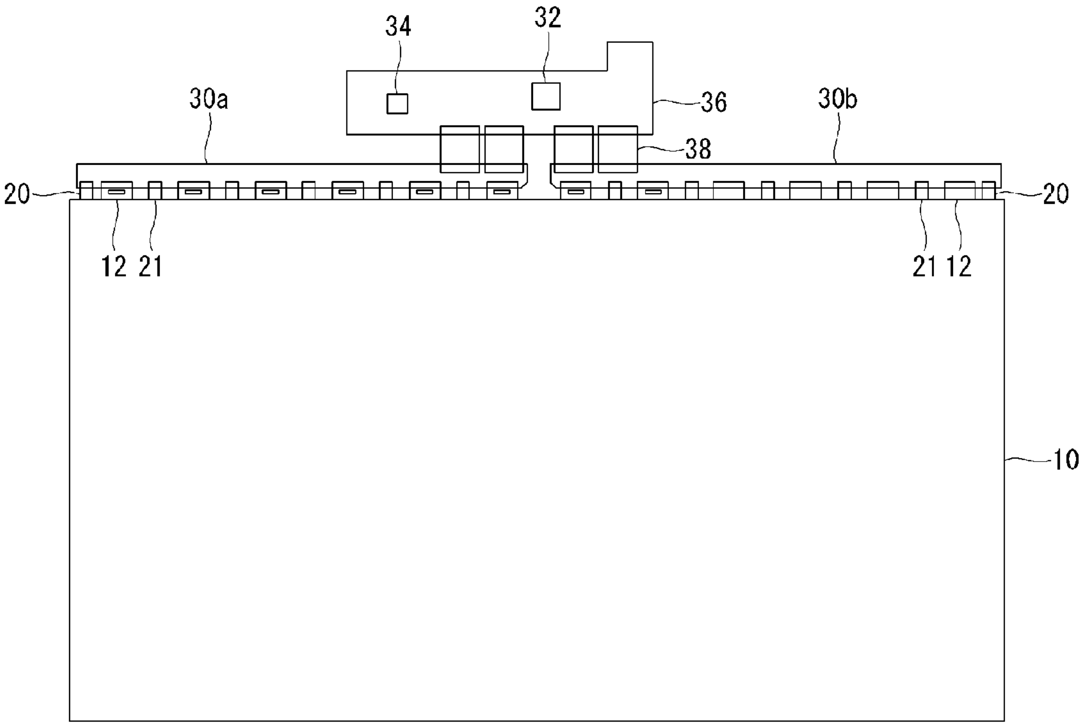
FIG. 7 is a plane view showing in detail a display device according to an exemplary embodiment of the invention.
Figure 8:
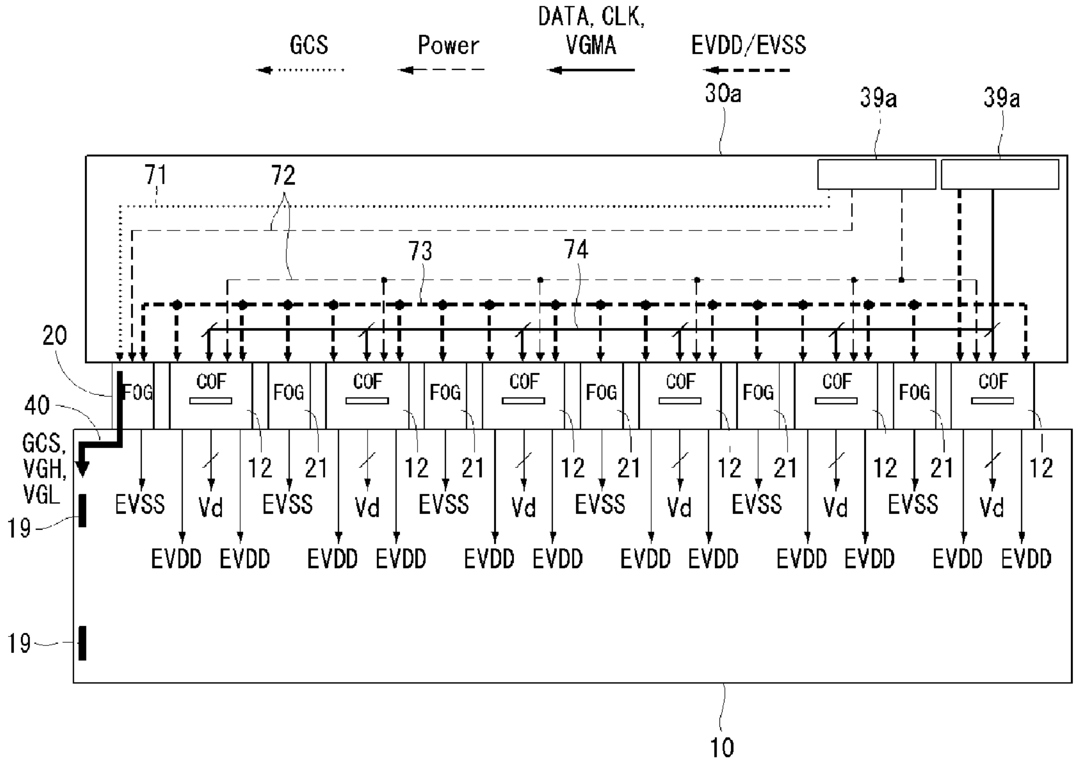
FIG. 8 is a plane view enlarging a left source PCB shown in FIG. 7 and a portion of a display panel under the left source PCB.

As shown in FIG. 8, lines 71 to 74 for transmitting electric powers and signals required to drive source driver integrated circuits (ICs) 14 and a gate driver IC 18 are formed on the source PCB 30. As shown in FIG. 7, if the size of the display panel 10 increases, the source PCB 30 may be divided into two parts, and two source PCBs 30*a* and 30*b* may be bonded to the display panel 10.

A timing controller 32, a power IC 34, and other circuits are mounted on the control PCB 36. The timing controller 32 receives digital video data of an input image and a timing signal from the outside and transmits the digital video data to the source driver ICs 14. The control PCB 36 may be connected to the source PCB 30 through the flexible circuit film 38 and connectors 39*a* and 39*b*. The flexible circuit film 38 may be implemented as an existing flexible flat cable (FFC) film or an existing flexible printed circuit (FPC) film.

The timing controller 32 transmits digital video data DATA (refer to FIG. 8) of an input image received from an external host system to the source driver ICs 14. The timing controller 32 generates a source timing control signal for controlling operation timing of the source driver ICs 14 and a gate timing control signal for controlling operation timing of the gate driver IC 18 using a timing signal received from the external host system. The gate timing control signal GCS (refer to FIG. 8) includes a gate start pulse GSP, a gate output enable signal GOE, and a gate shift clock GSC. The gate start pulse GSP is input to a shift register of the gate driver IC 18 and controls start timing of the shift register. The gate output enable signal GOE controls output timing of the gate driver IC 18. The gate shift clock GSC controls shift timing of the shift register of the gate driver IC 18.

The host system may be implemented as one of a television system, a set-top box, a navigation system, a DVD player, a Blu-ray player, a personal computer (PC), a home theater system, and a phone system.

The power IC 34 generates the electric powers EVDD and EVSS applied to the pixels 28 of the display panel 10, electric powers VCC of the source and gate driver ICs 14 and 18, a gamma compensation voltage VGMA, gate driving powers VGH and VGL, etc. The gate driving powers include a gate high voltage VGH and a gate low voltage VGL. The gate high voltage VGH and the gate low voltage VGL are supplied to the gate driver IC 18. The gate high voltage VGH is greater than a threshold voltage of the switching TFT ST, and the gate low voltage VGL is less than a threshold voltage of the switching TFT ST. The gate pulse output from the gate driver IC 18 swings between the gate high voltage VGH and the gate low voltage VGL. The gate pulse may be divided into an initialization pulse for initializing the gate electrode of the driving TFT DT, a scan pulse synchronized with the data voltage, an emission control pulse for controlling emission timing of the OLED, etc. The initialization pulse, the scan pulse, the emission control pulse, etc. are independently applied to the different gate lines 26 and are sequentially shifted along a scan direction.

The gate timing control signal GCS and the gate driving powers VGH and VGL are transmitted to the gate driver IC 18 through the source PCB 30, the flexible film cable 20, line-on-glass (LOG) lines 40, and the gate flexible circuit film 16. The LOG lines 40 are directly formed on the substrate of the display panel 10 using the same metal as the data lines 24 or the gate lines 26 of the pixel array 11 when the lines 24 or 26 of the pixel array 11 are formed. The LOG lines 40 electrically connect the flexible film cable 20 with the gate flexible circuit film 16 and thus transfer the gate timing control signal GCS and the gate driving powers VGH and VGL from the flexible film cable 20 to the gate flexible circuit film 16.

The source driver ICs 14 are respectively mounted on the source flexible circuit films 12. Input terminals of the source flexible circuit films 12 are bonded to the source PCB 30 through an anisotropic conductive film (ACF). Output terminals of the source flexible circuit films 12 are bonded to the substrate of the display panel 10 and the source PCB 30 through the ACF, so that they are connected to the data lines 24. The digital video data DATA and the source timing control signal are transmitted to the source driver ICs 14 through lines formed on the source PCB 30 and the source flexible circuit films 12. The source timing control signal includes a source start pulse, a source shift clock, an ADC clock, a source output enable signal, etc. of the source driver ICs 14.

The source driver ICs 14 receives the digital video data DATA of the input image from the timing controller 32. The source driver ICs 14 converts the digital video data DATA into the gamma compensation voltage VGMA using an analog-to-digital converter (ADC) and generates a data voltage Vd (refer to FIG. 8). The data voltage Vd is supplied to the pixels 28 through the data lines 24. The data voltage Vd output from the source driver ICs 14 is supplied to the data lines 24 of the pixel array 11 through lines and data link patterns formed on the source flexible circuit films 12.

The gate driver IC 18 is mounted on the gate flexible circuit film 16. The gate flexible circuit film 16 is bonded to the substrate of the display panel 10, so that it is connected to the LOG lines 40 and the gate lines 26. FIG. 1 shows one gate driver IC 18 as an example. However, if the size of the display panel 10 increases, the number of gate driver ICs 18 may increase. For example, if the size of the display panel 10 increases, the gate driver ICs 18 may be respectively bonded to the left and right sides of the display panel 10. The gate driver ICs 18 may sequentially supply the gate pulse to the gate lines 26.

Figure 3:
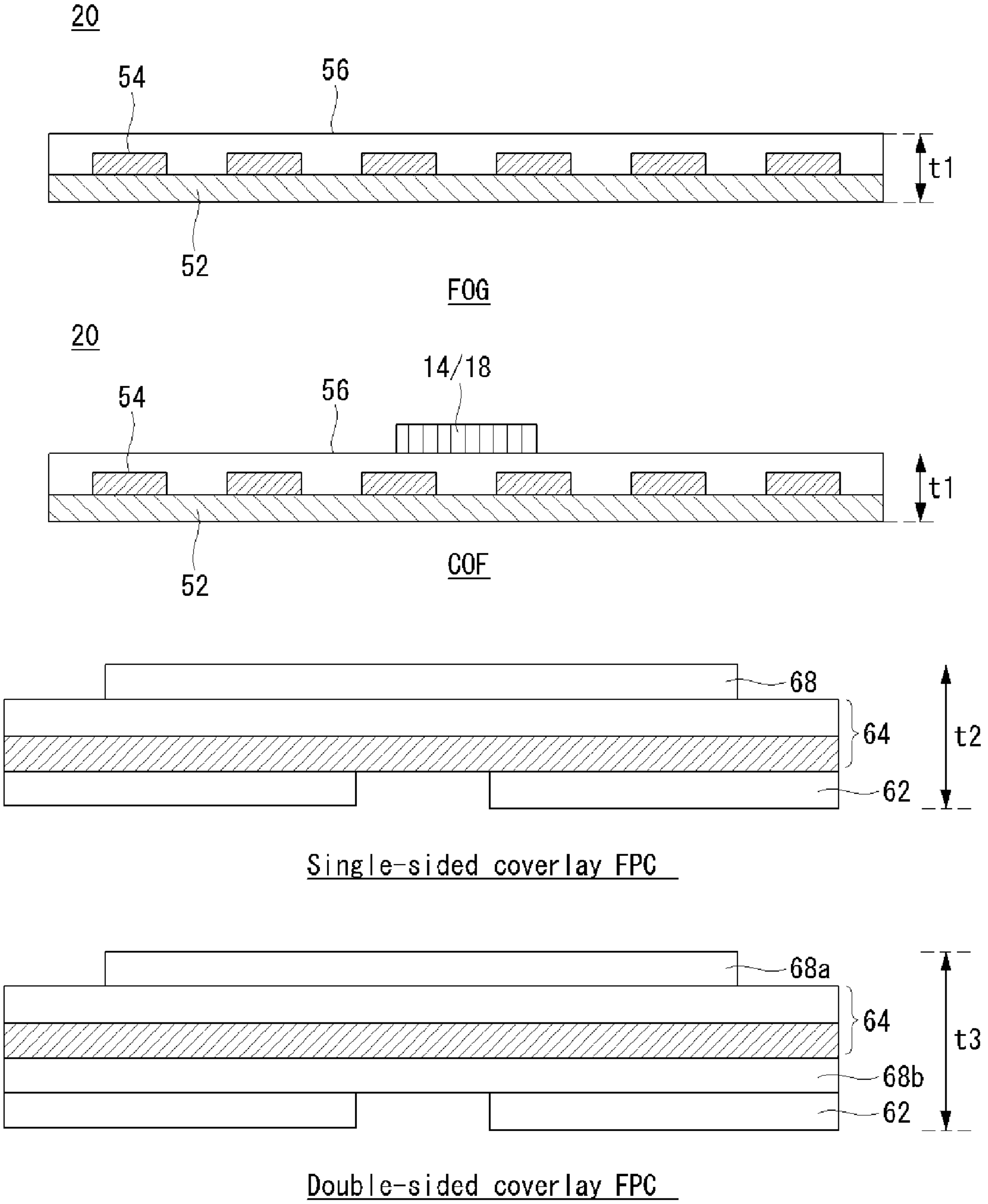
FIG. 3 is a cross-sectional view comparing a structure of a film-on-glass (FOG) film and a structure of a chip-on-film (COF) according to an exemplary embodiment of the invention with a structure of an existing flexible printed circuit (FPC) film.

The flexible film cable 20 is implemented as a film-on-glass (FOG) film shown in FIG. 3. The source flexible circuit film 12 and the gate flexible circuit film 16 are implemented as a chip-on-film (COF) shown in FIG. 3. The source flexible circuit film 12 and the gate flexible circuit film 16 substantially have the same cross-sectional structure as the flexible film cable 20, except the source and gate driver ICs 14 and 18 mounted thereon.

Figure 4:
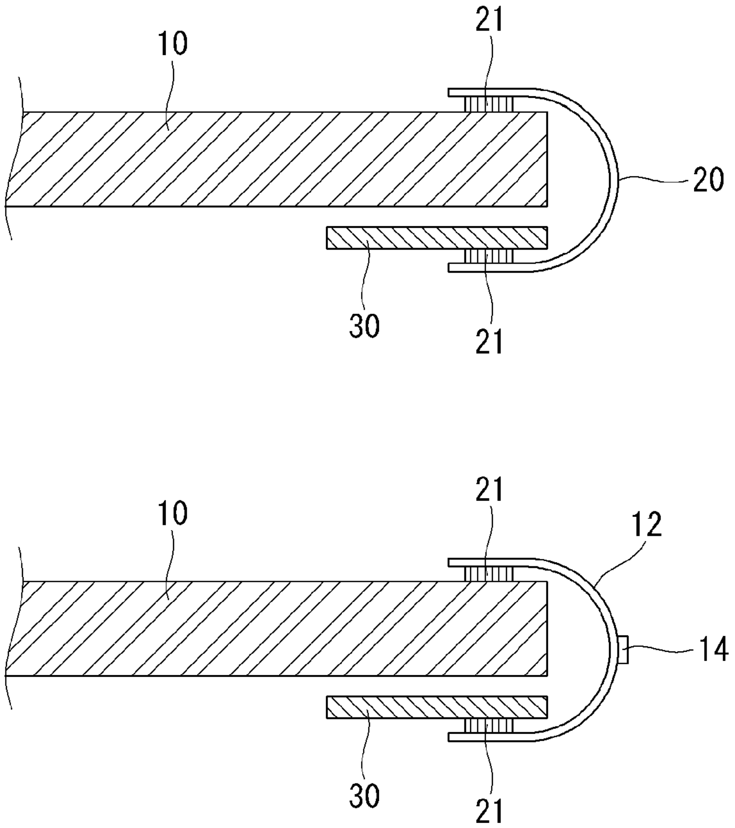
FIG. 4 is a cross-sectional view showing a state where a source PCB is disposed in the rear of a display panel by bending a FOG film and a COF shown in FIG. 3.

As shown in FIG. 3, the FOG film includes a polyimide film 52, metal lines 54 formed on the polyimide film 52, and a solder resist 56 covering the polyimide film 52 and the metal lines 54. The metal lines 54 may be formed of copper. A sum t1 of thicknesses of the polyimide film 52, the metal lines 54, and the solder resist 56 included in the FOG film is as thin as about 20 μm to 100 μm. The COF is substantially the same as the FOG film in a structure and a thickness t1 of stacked films. The COF is different from the FOG film in that the source driver IC 14 or the gate driver IC 18 is mounted on the COF. In other words, any IC is not mounted on the FOG film, and only the lines are formed on the FOG film. As shown in FIG. 4, the FOG film and the COF are bonded to the source PCB 30 and the substrate of the display panel 10 using an ACF 21 without a connector. The ACF bonding process has been automated using a surface mount technology equipment. Thus, a process for bonding the FOG film and the COF to the source PCB 30 or the substrate of the display panel 10 using the ACF 21 may be completely automated without a manual process.

The number and a total thickness of stacked films in the FOG film and the COF are less than the existing FFC or FPC film. Thus, as shown in FIG. 4, the FOG film and the COF may be easily bent without a crack, and the source PCB 30 may be disposed in the rear of the display panel 10.

As shown in FIG. 3, the FPC film may be manufactured in a single-sided coverlay structure or a double-sided coverlay structure. The FPC film of the single-sided coverlay structure includes a coverlay 68 formed on an upper surface of a base layer 64 and a reinforcement layer 62 attached to a lower surface of the base layer 64. The coverlay 68 is manufactured using a polyimide film. The base layer 64 includes a polyimide film and a copper foil pattern formed on the polyimide film. The reinforcement layer 62 is manufactured using a polyimide film or a polyethylene terephthalate (PET) film and functions as a reinforcement plate when the FPC film is bent or pressed. The FPC film of the double-sided coverlay structure includes an upper coverlay 68*a* formed on an upper surface of a base layer 64, a lower coverlay 68*b* formed on a lower surface of the base layer 64, and a reinforcement layer 62 attached to a lower surface of the lower coverlay 68*b*. Thicknesses t2 and t3 of the FPC film are about 300 μm to 350 μm and are much greater than the thicknesses of the FOG film and the COF. Further, the number of stacked films in the FPC film is more than the FOG film and the COF. Thus, because the FFC film or the FPC film has elasticity greater than the FOG film and the COF, tension is greatly applied to the FFC film or the FPC film when the FFC film or the FPC film is bent. Hence, the crack is easily generated in the FFC film or the FPC film when the FFC film or the FPC film is bent.

Figure 5:
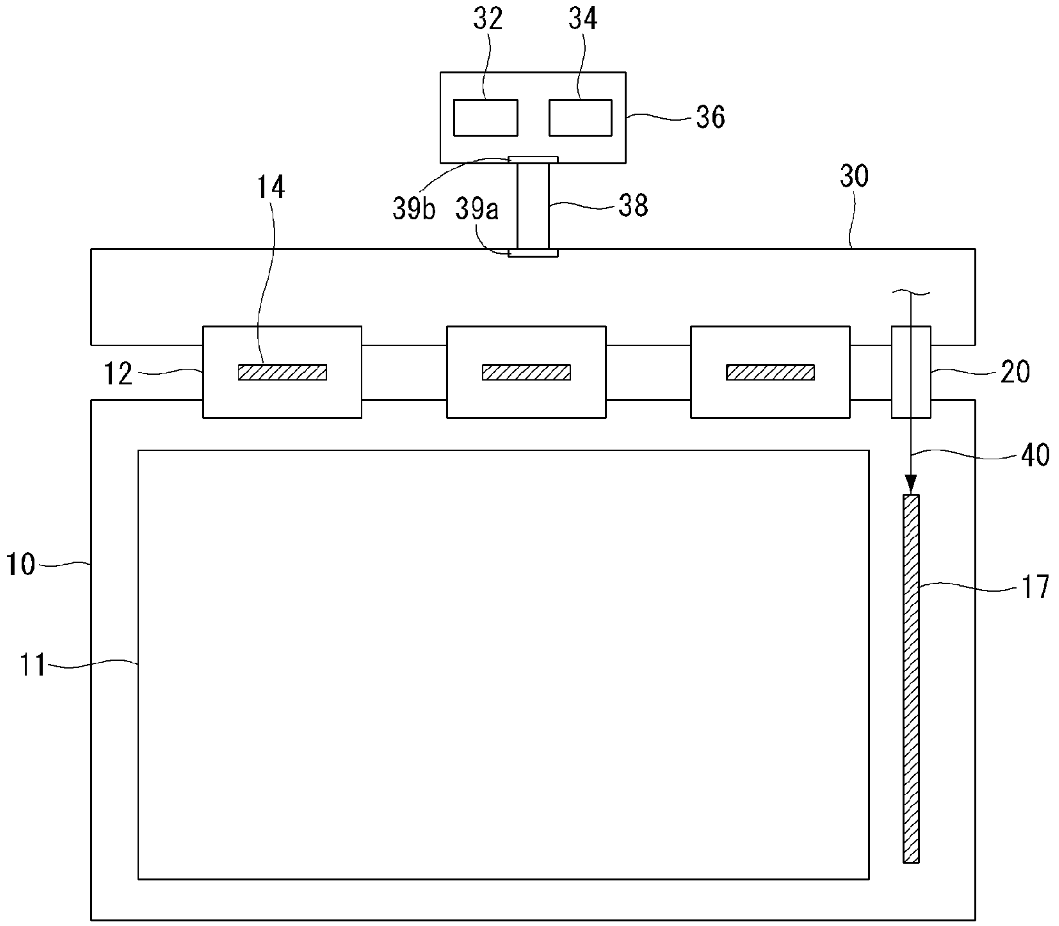
FIGS. 5 and 6 are plane views illustrating various mounting methods of a gate driving circuit.

As shown in FIG. 5, a gate driver IC 17 may be directly formed on the substrate of the display panel 10 through a gate-in-panel (GIP) process. The GIP process forms a circuit of the gate driver IC 17 on the substrate of the display panel 10 at the same time as the pixel array 11. The gate timing control signal GCS and the gate driving powers VGH and VGL required to drive the gate driver IC 17 are transmitted to the gate driver IC 17 through the source PCB 30, the flexible film cable 20, and the LOG lines 40.

Figure 6:
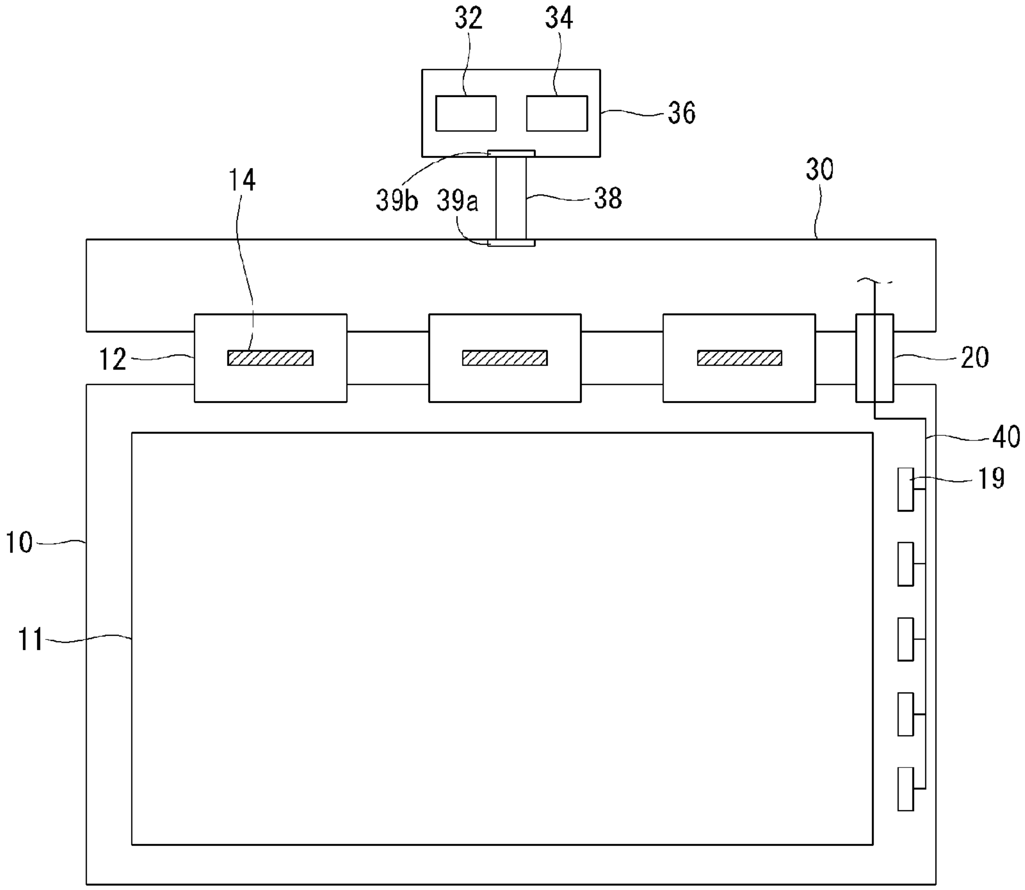

Alternatively, as shown in FIG. 6, a gate driver IC 19 may be directly bonded on the substrate of the display panel 10 through a chip-on-glass (COG) process. The COG type gate driver IC 19 is attached to the substrate of the display panel 10 using the ACF. The gate timing control signal GCS and the gate driving powers VGH and VGL required to drive the gate driver IC 19 are transmitted to the gate driver IC 19 through the source PCB 30, the flexible film cable 20, and the LOG lines 40.

The embodiment of the invention prevents a short circuit between EVDD lines and EVSS lines using first and second flexible film cables 20 and 21 shown in FIGS. 7 and 8, so as to solve a problem of the burnt out resulting from a short circuit of the lines having a potential difference in the organic light emitting display.

As shown in FIGS. 7 and 8, a first line group 71, a second line group 72, a third line group 73, and a fourth line group 74 are formed on the source PCBs 30*a* and 30*b*.

The first line group 71 is formed between a connector 39*a* and the first flexible film cable 20 and transmits the gate timing control signal GCS and the gate driving powers VGH and VGL to the gate driver IC 19. The first flexible film cable 20 and the gate driver IC 19 are connected to the LOG lines 40.

The second line group 72 transmits electric powers S-VCC and G-VCC of the source driver IC 14 and the gate driver IC 19 to the source driver IC 14 and the gate driver IC 19. The electric power G-VCC of the gate driver IC 19 is transmitted to the gate driver IC 19 via the first flexible film cable 20 and the LOG lines 40. The electric power S-VCC of the source driver IC 14 is applied to the source driver IC 14 through the flexible circuit film 12.

The third line group 73 transmits the high potential pixel power voltage EVDD and the low potential pixel power voltage EVSS to the flexible circuit film 12, on which the first and second flexible film cables 20 and 21 and the source driver IC 14 are mounted. The high potential pixel power voltage EVDD is applied to the pixels of the display panel 10 through lines of dummy channels of the flexible circuit film 12. The flexible circuit film 12 does not have the line to which the low potential pixel power voltage EVSS is applied. The low potential pixel power voltage EVSS is applied to the pixels of the display panel 10 only through the first and second flexible film cables 20 and 21. The flexible circuit film 12 and the first and second flexible film cables 20 and 21 are separated from each other by a predetermined distance and are bonded to the substrate of the display panel 10. Thus, the embodiment of the invention may prevent the problem of the burnt out because there is no short circuit between the EVDD lines and the EVSS lines even if the flexible circuit film 12 and the substrate of the display panel 10 are misaligned or the first and second flexible film cables 20 and 21 and the substrate of the display panel 10 are misaligned.

The fourth line group 74 transmits the digital video data DATA of the input image, a source shift clock CLK, the gamma compensation voltage VGMA, etc. to the source driver ICs 14.

The first flexible film cable 20 is formed at left and right bezels of the display panel 10 close to the gate driver IC 19. The first flexible film cable 20 is manufactured using the FOG film shown in FIG. 3 and thus is easily bent. The first flexible film cable 20 includes lines which are connected to the first line group 71 and receive the gate timing control signal GCS and the gate driving powers VGH and VGL through the first line group 71. Further, the first flexible film cable 20 includes lines which are connected to the EVSS lines of the third line group 73 and receive the low potential pixel power voltage EVSS. Further, the first flexible film cable 20 includes lines connected to the G-VCC lines of the second line group 72.

The flexible circuit film 12, on which the source driver IC 14 is mounted, is disposed between the first flexible film cable 20 and the second flexible film cable 21. The second flexible film cable 21 is manufactured using the FOG film shown in FIG. 3 and thus is easily bent. The second flexible film cable 21 includes lines which are connected to the EVSS lines of the third line group 73 and receive the low potential pixel power voltage EVSS. The second flexible film cable 21 does not have the EVDD line.

The flexible circuit film 12 is manufactured using the COF film shown in FIG. 3 and thus is easily bent. The flexible circuit film 12 is disposed between the first flexible film cable 20 and the second flexible film cable 21 or between the adjacent second flexible film cables 21. The flexible circuit film 12 includes lines connected to the S-VCC lines of the second line group 72, lines of dummy channels connected to the EVDD lines of the third line group 73, and lines connected to lines of the fourth line group 74.

As described above, the embodiment of the invention transmits the gate timing control signal and the gate driving powers to the gate driver IC using the flexible film cable having the easily bendable structure. As a result, the embodiment of the invention may fold the PCB in the rear of the display panel without generating the defective PCB. Furthermore, the embodiment of the invention secures a sufficient distance between the high potential pixel power voltage lines and the low potential pixel power voltage lines, thereby preventing the burnt out resulting from the short circuit between the lines having the potential difference.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:

a display panel including a pixel array including data lines, gate lines crossing the data lines, and pixels arranged in a matrix form;

a source driver integrated circuit (IC) configured to supply a data voltage to the data lines;

a gate driver IC configured to supply a gate pulse to the gate lines;

a first flexible film cable bonded to a substrate of the display panel, the first flexible film cable including lines for transmitting gate timing control signals and gate driving powers received from a printed circuit board to the gate driver IC, wherein the first flexible film cable is formed at left and right bezels of the display panel close to the gate driver IC and includes lines connected to a low potential pixel power voltage (EVSS), a gate timing control signal, and gate driving powers;

a second flexible film cable including lines connected to the EVSS; and a flexible circuit film on which the first and second flexible film cables and the source driver IC are mounted, wherein:

the flexible circuit film includes lines connected to a high potential pixel power voltage (EVDD), the flexible circuit film is disposed between the first and second flexible film cables or between two neighboring second flexible film cables, the flexible circuit film is separated from the first and second flexible film cables by a predetermined distance to prevent the EVDD and EVSS being short-circuited, and the printed circuit board is disposed on a rear surface of the display panel and is connected to the gate driver IC disposed on a front surface of the display panel by the first flexible film cable and the flexible circuit film which are bent in a U shape, and the flexible circuit film has a thickness of 20 μm to 100 μm.

2. The display device of claim 1, wherein the first flexible film cable has a thickness of 20 μm to 100 μm so as to be bendable.

3. The display device of claim 2, wherein the first flexible film cable includes a polyimide film, metal lines formed on the polyimide film, and a solder resist covering the polyimide film and the metal lines.

4. The display device of claim 1, wherein a cross-sectional structure of the flexible circuit film except the source driver IC is substantially the same as the first flexible film cable.

5. The display device of claim 1, wherein the second flexible film cable has a thickness of 20 μm to 100 μm.

6. The display device of claim 5, wherein a cross-sectional structure of the flexible circuit film except the source driver IC is substantially the same as the first and second flexible film cables.

7. The display device of claim 1, wherein the flexible circuit film is disposed between adjacent second flexible film cables, and wherein each of the second flexible film cables has a thickness of 20 μm to 100 μm.

8. The display device of claim 7, wherein a cross-sectional structure of the flexible circuit film except the source driver IC is substantially the same as the first and second flexible film cables.

9. The display device of claim 8, further comprising line-on-glass (LOG) lines configured to connect the first flexible film cable with the gate driver IC, wherein the LOG lines are directly formed on the substrate of the display panel.

10. The display device of claim 9, wherein the first flexible film cable, the second flexible film cable, and the flexible circuit film are bonded to the printed circuit board and the substrate of the display panel through an anisotropic conductive film (ACF).

11. The display device of claim 10, wherein the printed circuit board includes:

a first line group configured to receive the gate timing control signals and the gate driving powers to be transmitted to the gate driver IC;

a second line group configured to receive electric powers of the source driver IC and the gate driver IC;

a third line group configured to receive the high potential pixel power voltage and the low potential pixel power voltage; and a fourth line group configured to receive digital video data of an input image, clocks, and a gamma compensation voltage.

12. A display device comprising:

a display panel including a pixel array including data lines, gate lines crossing the data lines, and pixels arranged in a matrix form;

a source driver integrated circuit (IC) configured to supply a data voltage to the data lines;

a gate driver IC configured to supply a gate pulse to the gate lines;

a first flexible film cable disposed at left and right bezels of the display panel close to the gate driver, the first flexible film cable including lines connected to a low potential pixel power voltage (EVSS), gate timing control signals, and gate driving powers received from a printed circuit board to the gate driver IC;

a second flexible film cable including lines connected to the EVSS; and a flexible circuit film on which the first and second flexible film cables and the source driver IC are mounted, the flexible circuit film being connected to a high potential pixel power voltage (EVDD), the flexible circuit film having a thickness of 20 μm to 100 μm, wherein:

the flexible circuit film is disposed between the first and second flexible film cables and is separated from the first and second flexible film cables by a predetermined distance to prevent the EVDD and EVSS being short-circuited, and the printed circuit board is disposed on a rear surface of the display panel and is connected to the gate driver IC by the first flexible film cable and the flexible circuit film which are bent in a U shape.

13. The display device of claim 12, wherein the flexible circuit film is disposed between two neighboring second flexible film cables.

14. The display device of claim 12, wherein the first flexible film cable includes a polyimide film, metal lines formed on the polyimide film, and a solder resist covering the polyimide film and the metal lines.

* * * * *